United States Patent
Nakano et al.

(10) Patent No.: US 8,649,463 B2
(45) Date of Patent: Feb. 11, 2014

(54) RADIO COMMUNICATION APPARATUS

(75) Inventors: Hisao Nakano, Tokyo (JP); Yasunori Hoshihara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/391,240

(22) PCT Filed: Nov. 17, 2009

(86) PCT No.: PCT/JP2009/006156
§ 371 (c)(1),
(2), (4) Date: Feb. 17, 2012

(87) PCT Pub. No.: WO2011/061786
PCT Pub. Date: May 26, 2011

(65) Prior Publication Data
US 2012/0147928 A1    Jun. 14, 2012

(51) Int. Cl.
*H03K 9/00* (2006.01)
*H04L 27/00* (2006.01)

(52) U.S. Cl.
USPC .......... 375/316; 375/130; 375/260; 375/267; 375/346; 375/347

(58) Field of Classification Search
USPC .................. 375/130, 260, 267, 316, 346, 347
See application file for complete search history.

(56) References Cited

U.S. PATENT DOCUMENTS

| | | | |
|---|---|---|---|
| 8,019,029 B1* | 9/2011 | Katic | 375/346 |
| 2003/0185147 A1 | 10/2003 | Taga et al. | |
| 2006/0171445 A1* | 8/2006 | Batra et al. | 375/130 |
| 2007/0153878 A1 | 7/2007 | Filipovic | |
| 2007/0223608 A1* | 9/2007 | Nakayama et al. | 375/260 |
| 2009/0023404 A1 | 1/2009 | Leinonen et al. | |
| 2009/0274228 A1* | 11/2009 | Nakayama | 375/260 |

FOREIGN PATENT DOCUMENTS

| | | |
|---|---|---|
| JP | 2000-013357 A | 1/2000 |
| JP | 2003-283454 A | 10/2003 |
| JP | 2006-174218 A | 6/2006 |
| JP | 2007-258904 A | 10/2007 |
| JP | 2008-124815 A | 5/2008 |
| JP | 2009-522946 A | 6/2009 |
| WO | WO 2007/039557 A1 | 4/2007 |

* cited by examiner

*Primary Examiner* — Chieh M Fan
*Assistant Examiner* — Freshteh N Aghdam
(74) *Attorney, Agent, or Firm* — Birch, Stewart, Kolasch & Birch, LLP (57) ABSTRACT

In UWB communication based on an MB-OFDM communication scheme, when a jamming interference is detected within a receiving frequency band, the frequency of a local signal LO is altered to a frequency that will cause the jamming to be converted to a frequency outside the pass band of an LPF.

10 Claims, 5 Drawing Sheets

RADIO COMMUNICATION APPARATUS

TECHNICAL FIELD

The present invention relates to a radio communication apparatus for carrying out UWB (Ultra Wide Band) communication.

BACKGROUND ART

Since it is difficult for the UWB communication, which occupies frequencies of a ultra wide bandwidth, to maintain a dedicated band, it shares a frequency band with existing communication systems. Accordingly, it is feared that "interference" can occur between the UWB radio communication apparatus and the existing communication systems, resulting in jamming on transmission signals to each other.

As for the interference the UWB radio communication apparatus gives to the existing communication systems, a technique called DAA (Detect and Avoid), which circumvents the interference by detecting the presence or absence of a signal from the existing communication systems and by putting a notch in the UWB transmission wave at a particular frequency at which the signal occurs, has already been put to practical use.

For example, Patent Document 1 discloses a UWB radio communication apparatus employing an MB-OFDM (Multi-Band-Orthogonal Frequency Division Multiplexing) communication scheme capable of implementing the detection in the DAA appropriately by preventing a dead zone from occurring near its local frequency by employing a Low-IF technique as a downconverter on the receiver side.

On the other hand, as for the interference the UWB radio communication apparatus receives from the existing communication system, the existing communication systems do not have duty to avoid the interference. Accordingly, when the UWB radio communication apparatus detects interference, a higher rank MAC (Media Access Control) layer usually avoids using the band undergoing the interference by deciding and making band switching.

However, there is a possibility that a similar interference can occur in the band to which the switching is made. In addition, when using another band is limited by law, the interference avoidance by band switching cannot be achieved.

Figure 5:
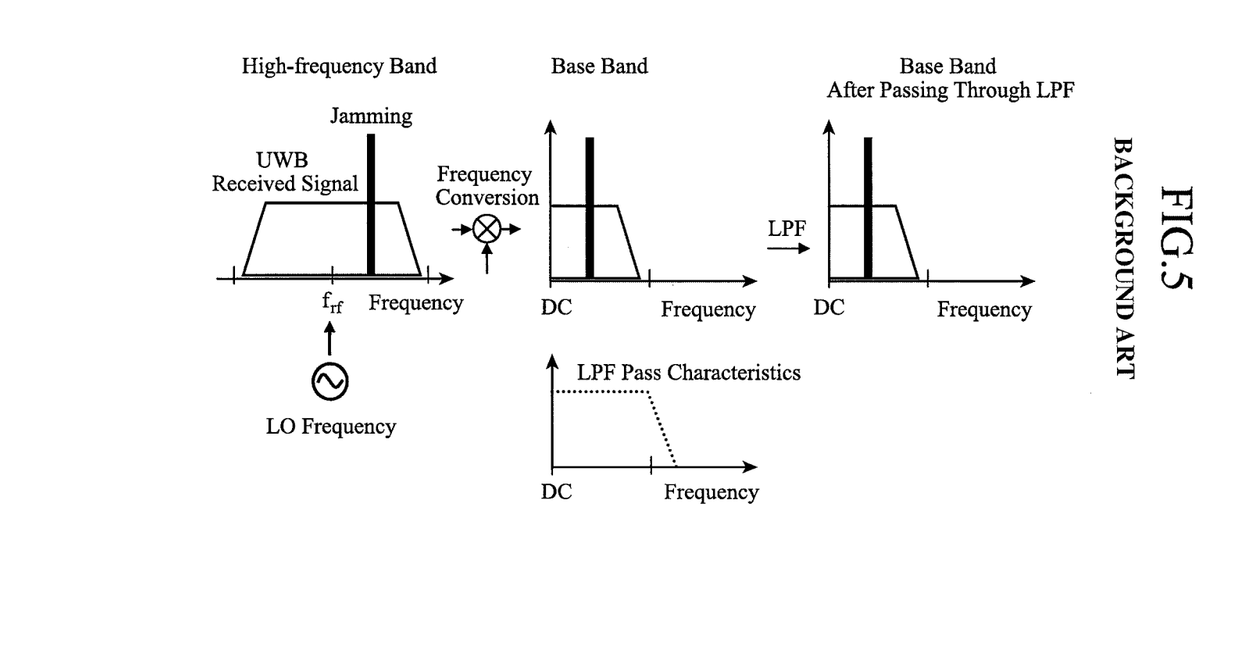
FIG. 5 is a diagram for explaining interference a UWB radio communication apparatus receives from an existing communication system.

FIG. 5 is a diagram for explaining interference the UWB radio communication apparatus receives from an existing communication system. Jamming as shown in FIG. 5 occurs because of a transmission wave from an existing communication system that shares a band with the UWB radio communication apparatus or because the out-of-band spurious radiation from an existing communication system using an adjacent band enters the band of the UWB radio communication. Here, as compared with the bandwidth of the UWB, 528 MHz, that of the existing communication systems is narrow of about several tens of MHz. In addition, since the UWB scatters the power to a wide band, the power density is much smaller than that of other communication systems.

The signal of the foregoing band, which is received with an antenna and is amplified, undergoes frequency conversion to a baseband signal by being multiplied by a local signal LO with the same frequency as the reception center frequency $f_{rf}$. After that, its low-frequency component, which passes through a low-pass filter (LPF) with passing characteristics indicated by broken lines in FIG. 5, is amplified and demodulated through a variable gain amplifier (VGA). In this case, the variable gain amplifier (VGA) carries out AGC (Automatic Gain Control) in such a manner that the input signal level to the AD converter becomes constant.

As is clearly seen from the baseband signal after passing through the LPF shown in FIG. 5, the jamming entering the band cannot be attenuated even if it is passed through the low-pass filter (LPF) or a band-pass filter (BPF).

Accordingly, when both the UWB desired wave and jamming are present within the band, the gain is controlled with respect to the signal level including the jamming.

Accordingly, depending on the level difference between the jamming and the desired wave (D/U ratio), enough amplitude (resolution of the AD conversion) for receiving the desired wave signal cannot be obtained, offering a problem of causing a UWB frame detection error or a receiving error such as a bit error.

The problem cannot be solved by the invention disclosed in the Patent Document 1 that proposes the technique of avoiding the interference the transmitter provides to the existing communication systems.

The present invention is implemented to solve the foregoing problem. Therefore it is an object of the present invention to provide a radio communication apparatus capable of avoiding interference due to jamming from an existing communication system by attenuating the jamming, which has passed through the conversion to the baseband signal frequency, by shifting it to the outside of the pass band of the low-pass filter in the UWB communication based on an MB-OFDM communication scheme.

PRIOR ART DOCUMENT

Patent Document

Patent Document 1: Japanese Patent Laid-Open No. 2007-258904.

DISCLOSURE OF THE INVENTION

A radio communication apparatus in accordance with the present invention comprises, in a radio communication apparatus conducting UWB communication based on an MB-OFDM communication scheme, a local signal oscillating unit for generating a local signal; a frequency converting unit for converting a received OFDM signal to a baseband signal in accordance with the frequency of the local signal generated by the local signal oscillating unit by using the local signal generated by the local signal oscillating unit; a low-pass filter unit for eliminating a high-frequency component from the baseband signal; an AD converting unit for converting the baseband signal passing through the low-pass filter unit to a digital signal; an FFT signal processing unit for acquiring received signals of individual subcarriers within a receiving frequency band by applying FFT signal processing to the baseband signal passing through the conversion to the digital signal by the AD converting unit; a data reproducing unit for restoring received data from the received signals of the individual subcarriers acquired by the FFT signal processing unit; and a local signal frequency control unit for controlling the local signal oscillating unit in a manner that alters the frequency of the local signal to a frequency that will cause the frequency converting unit to convert the jamming outside a pass band of the low-pass filter unit when the FFT signal processing unit detects interference due to the jamming within the receiving frequency band.

According to the present invention, when the jamming interference is detected within the receiving frequency band in the UWB communication based on the MB-OFDM communication scheme, the frequency of the local signal is altered to the frequency that will cause the jamming to be converted to the frequency outside the pass band of the low-pass filter unit. This offers an advantage of being able to circumvent the jamming interference by attenuating the jamming detected within the receiving frequency band of the OFDM signal.

EMBODIMENTS FOR CARRYING OUT THE INVENTION

The best mode for carrying out the invention will now be described with reference to the accompanying drawings to explain the present invention in more detail.

Embodiment 1

Figure 1:
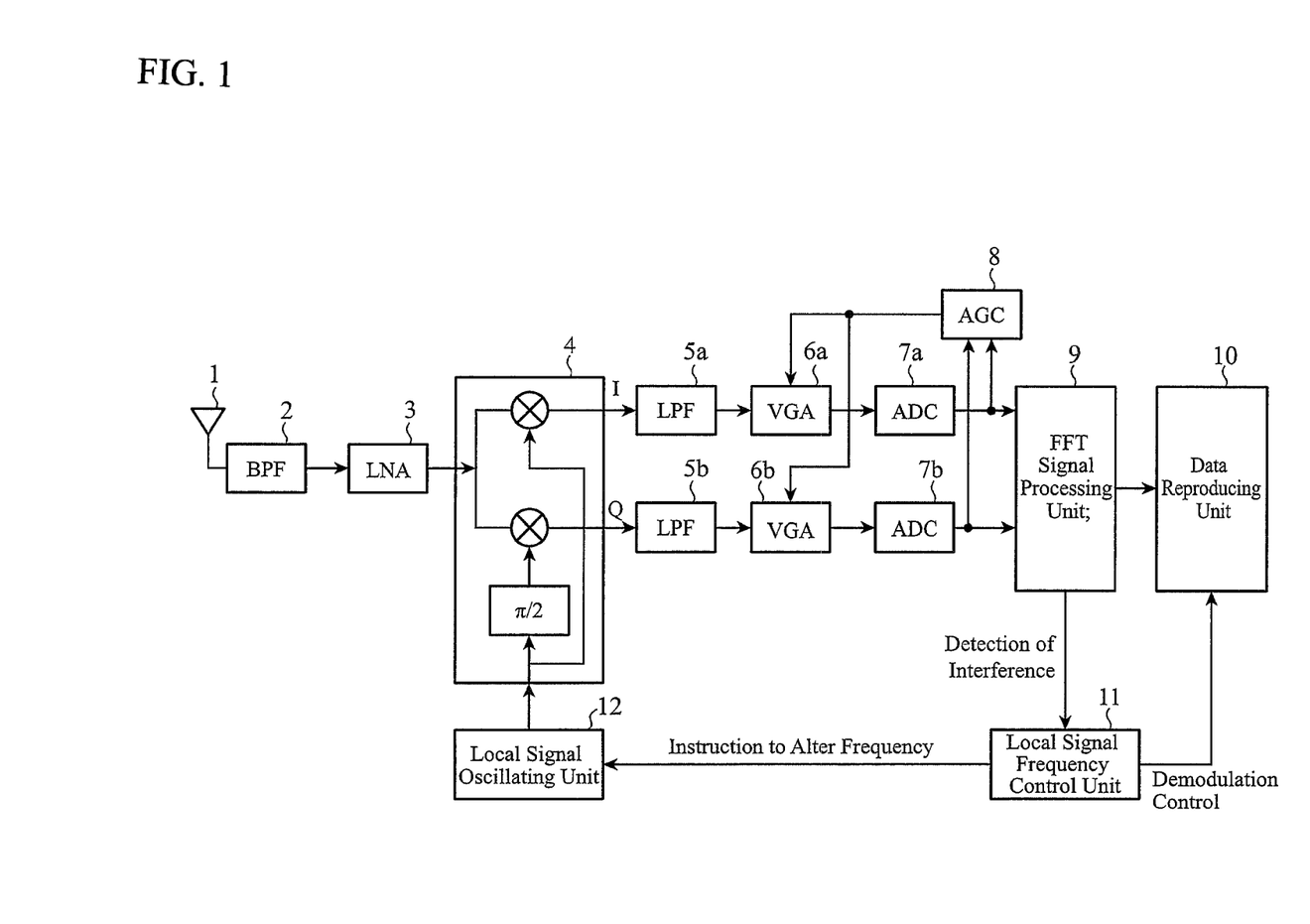
FIG. 1 is a block diagram showing a configuration of a radio communication apparatus of an embodiment 1 in accordance with the present invention.

FIG. 1 is a block diagram showing a configuration of a radio communication apparatus of an embodiment 1 in accordance with the present invention, which shows a receiving apparatus for carrying out UWB communication in the MB-OFDM communication scheme. In FIG. 1, the radio communication apparatus of the embodiment 1 comprises an antenna 1, a band-pass filter (BPF) 2, low noise amplifier (LNA) 3, an orthogonal mixer 4, low-pass filters (LPFs) 5a and 5b, variable gain amplifiers (VGAs) 6a and 6b, AD converters (ADCs) 7a and 7b, an automatic gain control unit (AGC) 8, an FFT (Fast Fourier Transform) signal processing unit 9, a data reproducing unit 10, a local signal frequency control unit 11 and a local signal oscillating unit 12.

Next, the operation will be described.

(A) When No Jamming Interference Occurs.

A signal received with the antenna 1 and passed through the BPF 2 is amplified by the LNA 3.

The orthogonal mixer 4 multiplies the signal amplified through the LNA 3 by signals obtained by providing a phase difference of 90 degrees to the local signal LO generated by the local signal oscillating unit 12, thereby carrying out frequency conversion (direct conversion) of the signal to baseband signals of the I component and Q component, respectively.

Incidentally, the local signal LO is a signal with the same frequency as the reception center frequency $f_{rf}$. In addition, the resultant baseband signals are both the upper and lower frequency bands (basebands) of the reception center frequency $f_{rf}$, which become signals within a pass band of the LPFs 5a and 5b at a post-stage.

The baseband signals undergoing the frequency conversion through the orthogonal mixer 4 are passed through the LPFs 5a and 5b for extracting low-frequency band signals. The baseband signals passing through the LPFs 5a and 5b are amplified through the VGAs 6a and 6b whose gains are controlled by the AGC 8 in such a manner that the input signals to the ADCs 7a and 7b have a fixed level.

After that, the FFT signal processing unit 9 applies FFT signal processing to the baseband signals which are converted to the digital signals through the ADCs 7a and 7b to convert them from the time axis signals to the frequency axis signals, and supplies them to the data reproducing unit 10. The data reproducing unit 10 decodes the signal passing through the FFT signal processing into an original signal series, thereby reproducing the received data.

(B) When Jamming Interference is Detected.

The processing up to the conversion of the baseband signals to the digital signals by the ADCs 7a and 7b are the same as that of the foregoing (A). The FFT signal processing unit 9 performs the FFT signal processing on the baseband signals converted to the digital signals through the ADCs 7a and 7b. At this time, the FFT signal processing unit 9 detects whether a jamming interference occurs within the baseband or not.

Here, a method of detecting jamming will be described.

First, the FFT signal processing unit 9 detects a received signal level at each frequency within the baseband by applying the FFT signal processing to the baseband signals. In the case of the UWB communication, the desired wave signal is broadband and has a flat signal level. Accordingly, as compared with the desired wave signal, a signal with a higher level at a particular frequency is decided as a jamming signal.

Thus, the FFT signal processing unit 9 decides the presence or absence of the jamming interference from the level difference (D/U ratio) between the decision target signal and the desired wave signal. For example, when the level difference (D/U ratio) exceeds a prescribed threshold, it decides that the jamming interference is present.

Incidentally, the jamming level and desired wave level fluctuate moment by moment in accordance with changes in transmission line conditions. To cope with the changes with respect to time, the FFT signal processing unit 9 averages the received signal level for each frequency within the baseband, calculates the level differences (D/U ratios) using the average values of the signal levels, and decides the presence or absence of the jamming interference.

The foregoing jamming detection processing can be achieved by utilizing the FFT signal processing unit originally installed in the radio communication apparatus based on the MB-OFDM communication scheme for OFDM demodulation and by modifying part of the operation logic of the FFT signal processing unit.

Accordingly, it is not necessary to add a special circuit for the jamming detection. In addition, using the D/U ratio for the detection decision makes it possible to detect the jamming interference accurately. Furthermore, the averaging processing of the signal levels can reduce erroneous detection of the jamming interference.

When the FFT signal processing unit 9 detects the jamming interference within the baseband, it notifies the local signal frequency control unit 11 of the frequency of the jamming signal detected. According to the jamming frequency delivered from the FFT signal processing unit 9, the local signal frequency control unit 11 selects the local signal frequency that will shift the frequency of the jamming signal, which has passed through the conversion to the baseband signal, to the outside of the pass band of the LPFs 5a and 5b. After that, the local signal frequency control unit 11 instructs the local signal oscillating unit 12 to alter the frequency to oscillate the local signal frequency selected.

Figure 2:
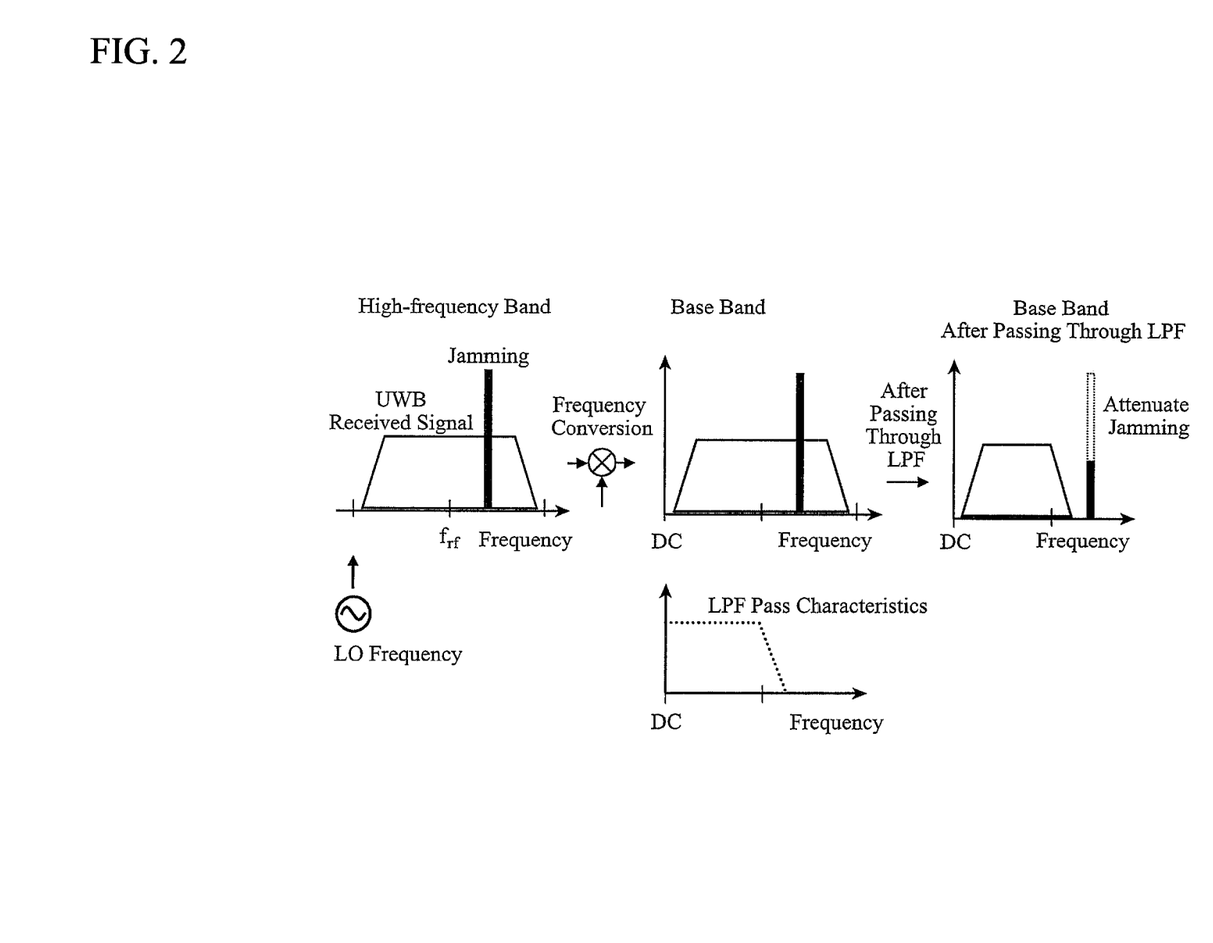
FIG. 2 is a diagram for explaining processing when the radio communication apparatus of the embodiment 1 detects a jamming interference.

FIG. 2 is a diagram for explaining the processing when the radio communication apparatus of the embodiment 1 detects the jamming interference. The example shown in FIG. 2 illustrates a case where the jamming is detected at a frequency higher than the reception center frequency.

In this case, the local signal frequency control unit 11 selects a frequency lower than the reception center frequency as the frequency of the local signal LO so that the frequency of the jamming signal after the conversion to the baseband signal falls outside the pass band of the LPFs 5a and 5b.

Incidentally, when the jamming is detected at a frequency lower than the reception center frequency, a frequency higher than the reception center frequency is detected as the frequency of the local signal LO.

Changing the frequency of the local signal LO causes the jamming after the conversion to the baseband signal to shift to the outside of the pass band of the LPFs 5a and 5b and to be attenuated through the LPFs 5a and 5b as shown in FIG. 2. This makes it possible to improve the D/U ratio of the desired wave signal.

The foregoing method has the advantage of being able to make the decision in accordance with the frequency of the jamming and to follow the changes of the jamming with respect to time. Although the example of FIG. 2 shows a case that alters the frequency of the local signal LO to an end of the communication band, it is not limited to the end of the communication band. Setting the frequency of the local signal LO at a frequency, which will cause the jamming to be converted to the outside of the pass band of the LPF and which will enable receiving a broader desired wave frequency band, can improve the sensitivity as compared with the case where the received frequency band of the desired wave after passing through the LPF is halved as shown in FIG. 2.

Changing the frequency of the local signal LO will shift the subcarrier arrangement in the baseband signal supplied to the FFT signal processing unit 9. To solve the problem, conversion of the subcarrier arrangement and processing of phase rotation correction based on pilot signals of the subcarriers are executed. In addition, processing of discarding the data in a received spurious band is carried out.

In addition, since the receiving frequency band is halved, it is feared that the received data might be omitted. Concerning this, the data reproducing unit 10 can restore the received data from the received signal of the one-side frequency band without missing data by carrying out demodulation using features of the data allocation to the subcarriers in the UWB communication based on the MB-OFDM communication scheme.

Figure 3:
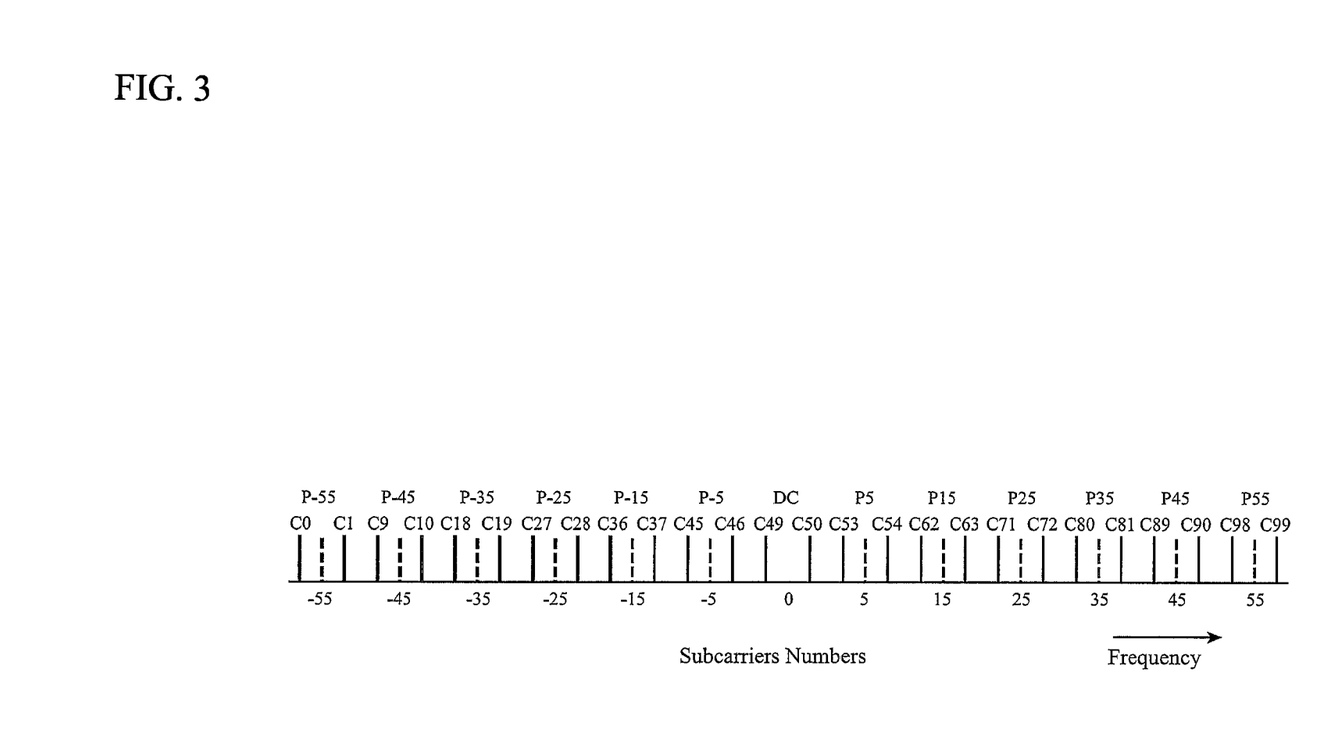
FIG. 3 is a diagram showing a subcarrier arrangement in UWB communication based on an MB-OFDM communication scheme.

FIG. 3 is a diagram showing a subcarrier arrangement in the UWB communication based on the MB-OFDM communication scheme. As shown in FIG. 3, the UWB communication has specifications that have six pilot signals P-5, P-15, P-25, P-35, P-45, P-55 in each of the upper and lower frequency bands of the center frequency (DC subcarrier) and 50 subcarriers for data in each of them, C0, C1, C9, . . . , C99, and that the subcarriers with the same data are allocated in each of the upper and lower frequency bands of the center frequency.

The FFT signal processing unit 9 receives the baseband signals which correspond to one-side frequency band (frequency band without the jamming) of either the upper or lower side of the center frequency shown in FIG. 3 depending on the frequency of the jamming, for example, and which have the subcarrier arrangement shifted. The FFT signal processing unit 9 performs the FFT signal processing on the baseband signals received, and specifies the subcarrier arrangement (signals for individual subcarriers) of the baseband signal.

According to the altered frequency of the local signal LO and the signals for the individual subcarriers specified by the FFT signal processing unit 9, the data reproducing unit 10 carries out conversion to the original subcarrier arrangement, and executes processing of the phase rotation correction based on the pilot signals. In addition, when the foregoing processing restores the data in the received spurious band, the data reproducing unit 10 also executes the processing of discarding the data in the received spurious band.

Figure 4:
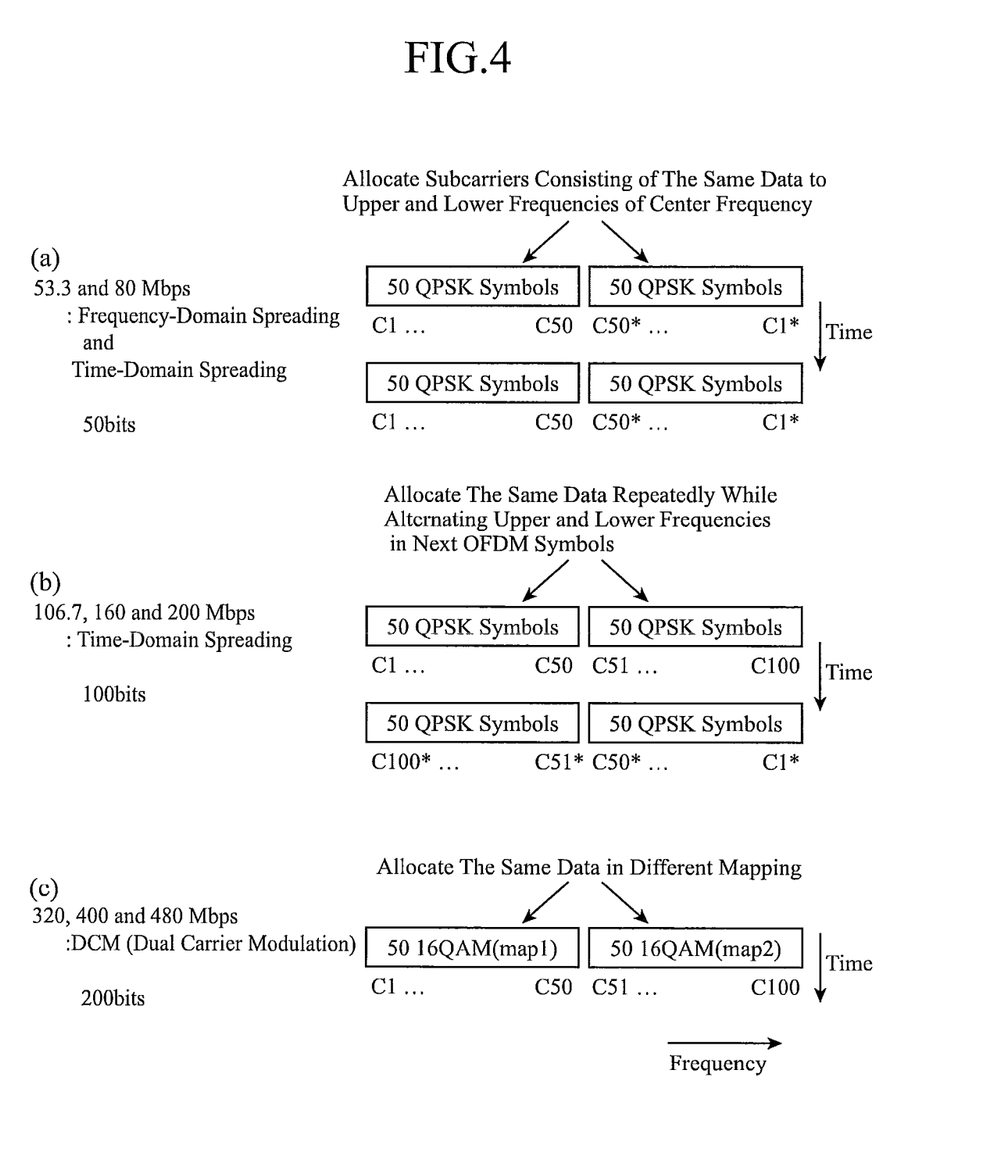
FIG. 4 is a diagram showing relationships between transmission rates and data allocation in the UWB communication based on the MB-OFDM communication scheme.

FIG. 4 is a diagram showing relationships between transmission rates and data allocation in the UWB communication based on the MB-OFDM communication scheme. FIG. 4(a) shows the data allocation when the transmission rate is 53.3 Mbps or 80 Mbps. As shown in FIG. 4(a), at these transmission rates, 50 subcarriers, which transmit the same data in QPSK (Quadrature Phase Shift Keying) symbols (OFDM symbols), are each allocated to the upper and lower frequency bands of the center frequency.

In addition, FIG. 4(b) shows data allocation when the transmission rate is 106.7 Mbps, 160 Mbps or 200 Mbps. At these transmission rates, although 50 subcarriers, which transmit the same data in the QPSK symbols, are each allocated to the upper and lower frequency bands of the center frequency in the same manner as in FIG. 4(a), the same data are allocated repeatedly with the upper and lower frequency bands being alternated as to the next QPSK symbols in the time axis direction.

Furthermore, FIG. 4(c) shows data allocation when the transmission rate is 320 Mbps, 400 Mbps or 480 Mbps. At these transmission rates, the same data are allocated in 16 QAM (Quadrature Amplitude Modulation) symbols to the upper and lower frequency bands of the center frequency in different mapping (map1 and map2).

As stated above, in the UWB communication based on the MB-OFDM communication scheme, although the data allocation varies depending on the transmission rates, the subcarriers consisting of the same data are allocated to both the upper and lower frequency bands of the center frequency at any transmission rates. According to the subcarrier arrangement pattern, the data reproducing unit 10 restores the received signals of the subcarriers removed through the LPFs 5a and 5b from the signals of the one-side frequency band of the upper and lower bands of the center frequency (DC subcarrier frequency), thereby reproducing the received data.

As described above, according to the present embodiment 1, when detecting the jamming interference within the receiving frequency band in the UWB communication based on the MB-OFDM communication scheme, it alters the frequency of the local signal LO to the frequency that will cause the jamming to be converted to a frequency out of the pass band of the LPF. By thus doing, it can attenuate the jamming detected within the receiving frequency band of the received signal, thereby being able to avoid the interference due to the jamming.

In addition, according to the present embodiment 1, when part of the receiving frequency band of the baseband signal is removed together with the jamming through the LPFs 5a and 5b because of the alteration of the frequency of the local signal LO by the control of the local signal frequency control unit 11, the FFT signal processing unit 9 applies the FFT signal processing to the baseband signal passing through the conversion to the digital signals by the ADCs 7a and 7b to acquire the received signals of the subcarriers passing through the LPFs 5a and 5b; and according to the subcarrier arrangement pattern which is defined in the UWB communication based on the MB-OFDM communication scheme and which includes the subcarriers that consist of the same data and are allocated to each of the upper and lower side frequency bands of the center frequency, the data reproducing unit 10 restores the received signals removed through the LPFs 5a and 5b from the received signals of the subcarriers which pass through the LPFs 5a and 5b and are acquired by the FFT signal processing unit 9, thereby reproducing the received data for each subcarrier within the original receiving frequency band.

By thus doing, the original received data are not missing even if part of the original receiving frequency band is removed through the LPFs 5a and 5b owing to the alteration of the frequency of the local signal LO used for the direct conversion.

Furthermore, according to the present embodiment 1, the FFT signal processing unit 9 detects the presence or absence of the jamming within the receiving frequency band from the level difference (D/U ratio) between the decision target signal and the desired wave signal, which is acquired by applying the FFT signal processing to the baseband signal.

As for the detection of the jamming interference, it can be realized by utilizing the FFT signal processing unit which is originally provided for the OFDM demodulation in the radio communication apparatus based on the MB-OFDM communication scheme and by modifying part of its operation logic. Accordingly, it can detect the jamming interference accurately by using the D/U ratio for the detection and decision without adding any special circuit for the jamming detection.

Incidentally, although the foregoing embodiment 1 shows an example of making a jamming interference detection during communication, it can detect jamming interference during the time while no communication is conducted.

For example, by setting the radio communication apparatus in accordance with the present invention at a receiving state during the idle time period without communication, it can detect the absolute level of the jamming signal from the level difference (D/U ratio) between the jamming and desired wave, which is obtained by the FFT signal processing unit 9, and from the control value of the AGC 8 at that time.

When the jamming signal level is not less than the decision threshold, it decides that the jamming interference occurs.

At that time, it is also possible to facilitate the processing by turning off the control of the AGC 8 and by setting the gain at a fixed value. This makes it possible to start communication in a state that avoids the jamming interference.

INDUSTRIAL APPLICABILITY

A radio communication apparatus in accordance with the present invention can avoid a jamming interference that can be caused by a signal from an existing communication system. Accordingly, it is suitable for onboard communication apparatuses that carry out communication for various purposes.

What is claimed is:

1. A radio communication apparatus that carries out UWB (Ultra Wide Band) communication based on an MB-OFDM (MultiBand-Orthogonal Frequency Division Multiplexing) communication scheme, the radio communication apparatus comprising:
   a local signal oscillating unit for generating a local signal;
   a frequency converting unit for converting a received OFDM signal to a baseband signal in accordance with a frequency of the local signal generated by the local signal oscillating unit;
   a low-pass filter unit for eliminating a high-frequency component from the baseband signal;
   an AD (analog-to-digital) converting unit for converting the baseband signal passing through the low-pass filter unit to a digital signal;
   an FFT (Fast Fourier Transform) signal processing unit for acquiring received signals of individual subcarriers within a receiving frequency band by applying FFT signal processing to the baseband signal passing through the conversion to the digital signal by the AD converting unit;
   a data reproducing unit for restoring received data from the received signals of the individual subcarriers acquired by the FFT signal processing unit; and
   a local signal frequency control unit for controlling the local signal oscillating unit in a mariner that alters the frequency of the local signal to a frequency that will cause the frequency converting unit to convert jamming outside a pass band of the low-pass filter unit when the FFT signal processing unit detects interference due to the jamming within the receiving frequency band, wherein
   the FFT signal processing unit acquires the received signals of the subcarriers passing through the low-pass filter unit by applying the FFT signal processing to the baseband signal converted to the digital signal by the AD converting unit when the frequency of the local signal is altered according to the control by the local signal frequency control unit and part of the receiving frequency band of the baseband signal is eliminated together with the jamming through the low-pass filter unit; and
   the data reproducing unit reproduces received data for the individual subcarriers within an original receiving frequency band by restoring the received signals eliminated by the low-pass filter unit from the received signals of the subcarriers which pass through the low-pass filter unit and are acquired by the FFT signal processing unit in accordance with a subcarrier arrangement pattern which is defined in the UWB communication based on the MB-OFDM communication scheme and which specifies allocation of the subcarriers having same data in each of upper and lower frequency bands of a center frequency.

2. The radio communication apparatus according to claim 1, wherein
   the FFT signal processing unit detects the presence or absence of the jamming interference within the receiving frequency band from a level difference between a decision target signal and a desired wave signal, the level difference being obtained by applying the FFT signal processing to the baseband signal.

3. The radio communication apparatus according to claim 1, wherein
   the FFT signal processing unit detects presence or absence of the jamming interference within the receiving frequency band during a time period during which no communication is conducted.

4. The radio communication apparatus according to claim 2, wherein
   the FFT signal processing unit detects the presence of the jamming interference when the level difference between the decision target signal and the desired wave signal exceeds a predetermined threshold.

5. The radio communication apparatus according to claim 2, wherein
   the FFT signal processing unit detects the absence of the jamming interference when the level difference between the decision target signal and the desired wave signal falls below a predetermined threshold.

6. A radio communication method that carries out UWB (Ultra Wide Band) communication based on an MB-OFDM (MultiBand-Orthogonal Frequency Division Multiplexing) communication scheme, the radio communication method comprising:

local signal oscillating step for generating a local signal;

a frequency converting step for converting a received OFDM signal to a baseband signal in accordance with a frequency of the local signal generated by the local signal oscillating step;

eliminating, by utilizing a low-pass filter unit, a high-frequency component from the baseband signal;

an AD (analog-to-digital) converting step for converting the baseband signal passing through the low-pass filter unit to a digital signal;

an FFT (Fast Fourier Transform) signal processing step for acquiring received signals of individual subcarriers within a receiving frequency band by applying FFT signal processing to the converted baseband signal;

a data reproducing step for restoring received data from the received signals of the individual subcarriers acquired by the FFT signal processing step; and a local signal frequency control step for controlling the local signal oscillating step in a manner that alters the frequency of the local signal to a frequency that will cause the frequency converting step to convert jamming outside a pass band of the low-pass filter unit when the FFT signal processing step detects interference due to the jamming within the receiving frequency band, wherein the FFT signal processing step acquires the received signals of the subcarriers passing through the low-pass filter unit by applying the FFT signal processing to the baseband signal converted to the digital signal when the frequency of the local signal is altered according to the control by the local signal frequency control step and part of the receiving frequency band of the baseband signal is eliminated together with the jamming through the low-pass filter unit; and the data reproducing step reproduces received data for the individual subcarriers within an original receiving frequency band by restoring the received signals eliminated by the low-pass filter unit from the received signals of the subcarriers which pass through the low-pass filter unit and are acquired by the FFT signal processing step in accordance with a subcarrier arrangement pattern which is defined in the UWB communication based on the MB-OFDM communication scheme and which specifies allocation of the subcarriers having same data in each of upper and lower frequency bands of a center frequency.

7. The radio communication method according to claim 6, wherein
the FFT signal processing step detects the presence or absence of the jamming interference within the receiving frequency band from a level difference between a decision target signal and a desired wave signal, the level difference being obtained by applying the FFT signal processing to the baseband signal.

8. The radio communication method according to claim 7, wherein
the FFT signal processing step detects the presence of the jamming interference when the level difference between the decision target signal and the desired wave signal exceeds a predetermined threshold.

9. The radio communication method according to claim 7, wherein
the FFT signal processing step detects the absence of the jamming interference when the level difference between the decision target signal and the desired wave signal falls below a predetermined threshold.

10. The radio communication method according to claim 6, wherein
the FFT signal processing step detects presence or absence of the jamming interference within the receiving frequency band during a time period during which no communication is conducted.

* * * * *